US012528254B2

United States Patent
Saudan et al.

(10) Patent No.: US 12,528,254 B2
(45) Date of Patent: Jan. 20, 2026

(54) METHOD FOR MANUFACTURING A 3D ELECTROMECHANICAL COMPONENT HAVING AT LEAST ONE EMBEDDED ELECTRICAL CONDUCTOR

(71) Applicant: CSEM CENTRE SUISSE D'ELECTRONIQUE ET DE MICROTECHNIQUE SA—RECHERCHE ET DEVELOPPEMENT, Neuchâtel (CH)

(72) Inventors: Hervé Saudan, Fribourg (CH); Lionel Kiener, Pomy (CH)

(73) Assignee: CSEM CENTRE SUISSE D'ELECTRONIQUE ET DE MICROTECHNIQUE SA - RECHERCHE ET DÉVELOPPEMENT, Neuchâtel (CH)

( * ) Notice: Subject to any disclaimer, the term of this patent is extended or adjusted under 35 U.S.C. 154(b) by 1141 days.

(21) Appl. No.: 16/962,000

(22) PCT Filed: Jan. 16, 2018

(86) PCT No.: PCT/EP2018/051032
§ 371 (c)(1),
(2) Date: Jul. 14, 2020

(87) PCT Pub. No.: WO2019/141351
PCT Pub. Date: Jul. 25, 2019

(65) Prior Publication Data
US 2020/0398496 A1    Dec. 24, 2020

(51) Int. Cl.
*B29C 64/40* (2017.01)
*B29C 64/106* (2017.01)
(Continued)

(52) U.S. Cl.
CPC ............ *B29C 64/40* (2017.08); *B29C 64/106* (2017.08); *B33Y 10/00* (2014.12); *B33Y 80/00* (2014.12); *H01R 43/10* (2013.01)

(58) Field of Classification Search
CPC ......... B29C 64/40; B33Y 10/00; B33Y 80/00; H01R 43/10; H01R 39/08
See application file for complete search history.

(56) References Cited

U.S. PATENT DOCUMENTS

| 2,961,385 A | 11/1960 | Mcgall |
| 2,967,283 A | 1/1961 | Medney |

(Continued)

FOREIGN PATENT DOCUMENTS

| DE | 1094867 | 12/1960 |
| DE | 1926219 | 11/1970 |

(Continued)

OTHER PUBLICATIONS

3D-Druck Wikipedia: https://web.archive.org/web/20171225172940/https://de.wikipedia.org/wiki/3D-Druck.

(Continued)

*Primary Examiner* — Livius R. Cazan
(74) *Attorney, Agent, or Firm* — DUANE MORRIS LLP; Gregory M. Lefkowitz; Daniel J. Tarr

(57) ABSTRACT

Method for manufacturing a 3D electromechanical component, having at least one embedded electrical conductor, comprising the steps consisting in:
implementing an additive manufacturing operation for building an electrically conductive skeleton of the 3D electromechanical component including a structural hull and at least one conductive wire at least partially located inside the structural hull and having first and second ends, at least one of which is mechanically linked to the structural hull;

(Continued)

filling the structural hull with an insulating material provided in a state in which it exhibits liquid-like behaviour;

implementing a solidification step to provide a solid-like behaviour of the insulating material, the latter thus embedding at least partially an electrical conductor.

8 Claims, 3 Drawing Sheets

(51) Int. Cl.
*B33Y 10/00* (2015.01)
*B33Y 80/00* (2015.01)
*H01R 43/10* (2006.01)

(56) References Cited

U.S. PATENT DOCUMENTS

| | | | |
|---|---|---|---|
| 3,126,596 | A | 3/1964 | Rector |
| 3,182,217 | A | 5/1965 | Quinn |
| 3,219,557 | A | 11/1965 | Quintana |
| 3,289,140 | A | 11/1966 | Slack |
| 3,435,402 | A | 3/1969 | Smith |
| 6,836,049 | B2 | 12/2004 | Terada |
| 2004/0242025 | A1 | 12/2004 | Angerpointner et al. |
| 2013/0303002 | A1* | 11/2013 | Oosterhuis ............ B29C 64/124 29/876 |
| 2014/0084745 | A1 | 3/2014 | Osawa |
| 2014/0268604 | A1 | 9/2014 | Wicker et al. |
| 2019/0245312 | A1* | 8/2019 | Holzapfel .............. H01R 39/08 |

FOREIGN PATENT DOCUMENTS

| | | |
|---|---|---|
| DE | 69401828 | 9/1997 |
| DE | 102015004150 | 10/2016 |
| EP | 2457719 | 5/2012 |
| EP | 3316425 | 5/2018 |
| WO | 2013007830 | 1/2013 |
| WO | 2014/152884 | 9/2014 |
| WO | 2018153637 | 8/2018 |

OTHER PUBLICATIONS

Definition of "monolithic" from the Merriam-Webster Dictionary: https://www.merriam-webster.com/dictionary/monolithic.

Silbernagel, C., et al., "Electrical resistivity of additively manufactured AlSi10Mg for use in electric motors", Additive Manufacturing, 2018, vol. 201, pp. 395-403.

Meyers Lexicon of Technology and the Exact Natural Sciences, vol. One, Mannheim 1696, pp. 16, 107; Meyers Lexicon of Technology and the Exact Natural Sciences, vol. Two, Mannheim 1970, pp. 1164, 1165, 1571, 1572 (Meyers Lexikon der Technik und der exakten Naturwissenschaften, Erster Band, Mannheim 1696, Seiten 16, 107; Meyers Lexikon der Technik und der exakten Naturwissenschaften, Zweiter Band, Mannehim 1970, Seiten 1164, 1165, 1571, 1572.).

* cited by examiner

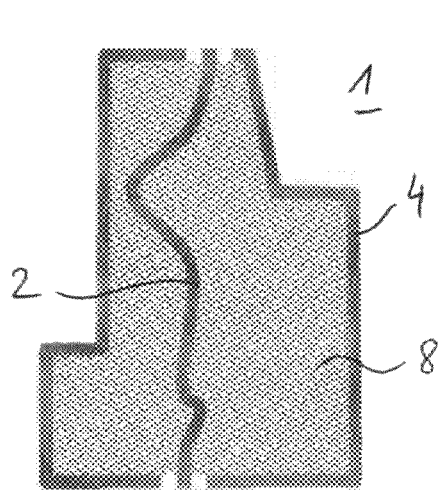
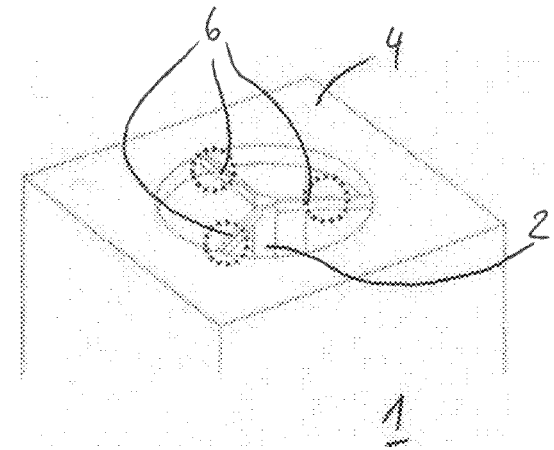
Fig. 1a                Fig. 1b
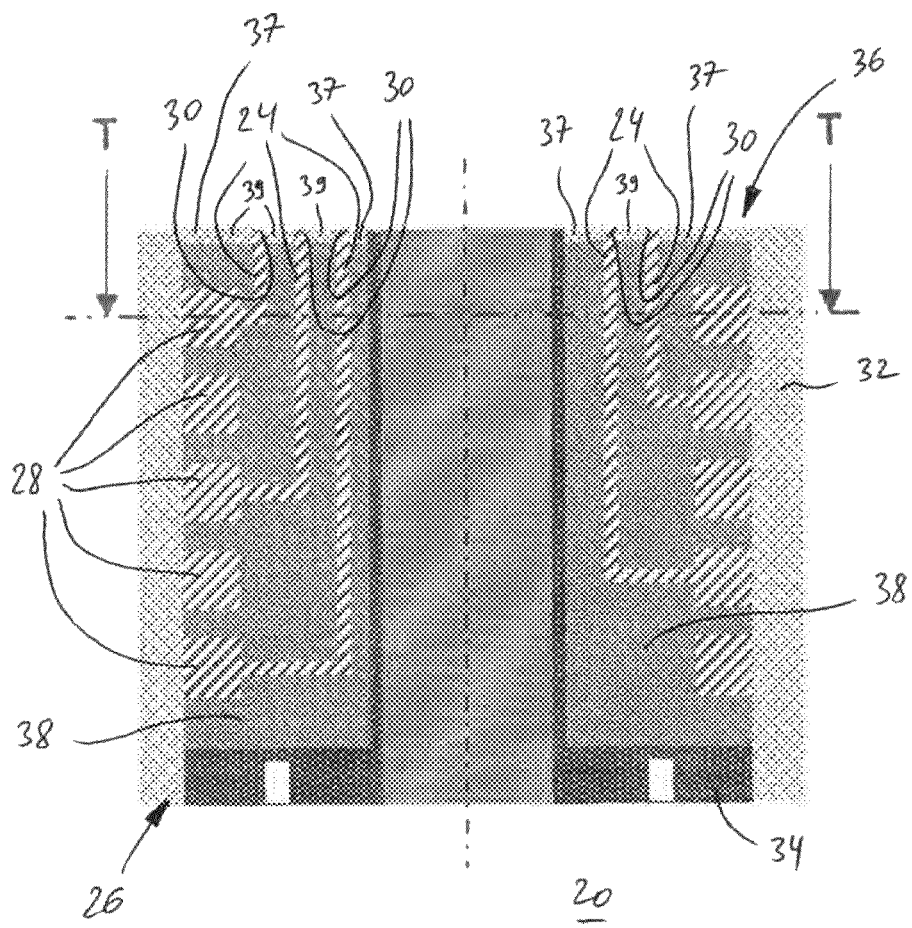
Fig. 2a

METHOD FOR MANUFACTURING A 3D ELECTROMECHANICAL COMPONENT HAVING AT LEAST ONE EMBEDDED ELECTRICAL CONDUCTOR

CROSS-REFERENCE TO RELATED APPLICATIONS

This application is a § 371 national stage entry of International Application No. PCT/EP2018/051032, filed Jan. 16, 2018, the entire contents of which are incorporated herein by reference.

TECHNICAL FIELD

The invention consists of a new design and manufacturing approach which makes it possible to merge two essential features of products comprising both mechanical and electrical features. Indeed, the present invention relates to a method for manufacturing a 3D electromechanical component, having at least one embedded electrical conductor.

STATE OF THE ART

Recent developments in the field of Additive Manufacturing (AM) introduced an extreme freedom for designing 3D mechanical components.

More recently, attempts have been made to add electrical functionalities to components built by implementation of AM techniques.

For instance, patent application WO 2014/152884 A1 provides a relevant summary of the state of the art in the field of manufacturing 3D electromechanical components.

Several publications can be found relating to implementation of stereolithography, which allows simultaneous printing of an insulating material and of a conducting material. The latter might be a conductive polymer in that case. According to another approach, a mechanical part can be structured by implementation of an AM technique (possibly stereolithography again, or other techniques like Fused Deposition Modeling, FDM, for instance), while a conductive ink can be printed, eventually in adapted channels provided in the mechanical part.

As highlighted in the above-mentioned patent application, however, the electromechanical components built by implementation of these manufacturing methods generally exhibit poor mechanical and or conductive properties, which limit drastically the scope of the possible corresponding applications. Indeed, the above methods (stereolithography and FDM) are limited to the processing of polymer materials.

A main object of patent application WO 2014/152884 A1 is thus to provide a method allowing the manufacturing of electromechanical components exhibiting improved mechanical and conductive properties.

For that purpose, this document proposes a method for embedding a conductive wire or mesh in a thermoplastic substrate during the fabrication of a 3D structure, the latter being fabricated in a layer-by-layer fashion, while a conductive wire or mesh might be embedded in a given layer brought in a flowable state, before the next layer is printed. A method is also disclosed in this document for interconnecting several conductive wires which are embedded in successive layers of the substrate in order to produce a real 3D electromechanical component.

However, despite the major improvement in the electrical properties of the thus fabricated electromechanical components, and though the applicant claims for a great improvement in the mechanical properties of the such components, in comparison with components manufactured through prior techniques, especially when a mesh is embedded in the AM substrate, these mechanical properties might still be limited for some particular applications. In parallel, the electrical conductibility and the current density are lower in comparison with components manufactured through prior techniques. Moreover, in that case, integration of a mesh in the substrate implies some important limitations in the design of other conductive wires which could be necessary for transporting electrical power from a point of the component to another. More generally, the disclosed method for embedding a conductive wire in a layer-by-layer fashion renders very complex the design and fabrication of a real 3D electromechanical component.

Consequently, a need still exists for a manufacturing method of 3D electromechanical components exhibiting a high mechanical robustness as well as good conductive properties allowing not only a transfer of data through conductive wires but also the transfer of electrical power with high current density. Furthermore, the complexity of the design of a given component, either for its structural part or for its electrical design part, should have a limited impact on the complexity for carrying out such a method so as to allow its implementation in the field of large scale manufacturing.

DISCLOSURE OF THE INVENTION

An aim of the invention is to propose a method for manufacturing a 3D electromechanical component, having at least one embedded electrical conductor, which overcomes at least partly the above-mentioned disadvantages of the prior art, and are hence suitable for a wide range of applications, also in the field of large scale manufacturing.

More specifically, the invention relates to a method for manufacturing a 3D electromechanical component, having at least one embedded electrical conductor, comprising the steps consisting in:

implementing an additive manufacturing operation for building an electrically conductive skeleton of the 3D electromechanical component including a structural hull and at least one conductive wire at least partially located inside the structural hull and having first and second ends, at least one of which is mechanically linked to the structural hull;

filling the structural hull with an insulating material provided in a state in which it exhibits a liquid-like behaviour;

implementing a solidification step to provide a solid-like behaviour of the insulating material, the latter thus embedding at least partially an electrical conductor.

Generally, the electrically conductive skeleton might be made of any conductive material which can be processed by means of an AM technology. The conductive material might typically be provided as a liquid or as a powder and might include one or several materials taken from the group comprising pure metals, metal alloys, polymers and ceramic composites including a conductive charge (metallic or carbon).

Suitable AM technologies comprise powder bed fusion, direct energy deposition, Fused Deposition Modeling (FDM) and material jetting.

Generally, the insulating material might typically be provided as a liquid or as a powder. A general wording will be used in the present description, for the purpose of ensuring conciseness, according to which the insulating material which is used to fill the structural hull goes through a "solidification" step then. Obviously, the one skilled in the art will unambiguously understand the corresponding passages of the description, being recalled that 1/ for powders, the solidification process can be described as:
   sintering, typically for ceramic compounds, including glass materials,
   fusion/solidification, typically for polymers, and
   setting, typically for cements;

2/ for liquids (including foams) the solidification process can be described as:
   curing, typically for thermosetting polymers (epoxy resins, polyester resins, polyurethanes, silicones, etc. . . . ), and
   solidification, typically for thermoplastics which can be injected (low viscosity might be requested, depending on the application).

As a result, the use of a conductive skeleton which is then filled in with an insulating material confers a significantly higher mechanical robustness to the corresponding electromechanical component in comparison to the components manufactured with prior methods, more particularly when the conductive material is metallic. The electrical properties of the electromechanical component according to the present invention might also be optimised, especially when additively-manufactured bulk metal is used to provide electrical connections between remote portions of the component. The obtained electrical conductivity value for additively-manufactured bulk metal is comparable with that of classical conductors made of the same bulk metallic material. Furthermore, the preferred but non-limiting use of powder-based additive manufacturing allows almost unlimited freedom of design regarding the geometric complexity of the electrical network inside the electromechanical component.

Advantageously, each of the first and second ends of the conductive wire might be linked to the structural hull.

More advantageously, at least one of the first and second ends of the conductive wire might be linked to the structural hull by means of a sacrificial bridge.

According to a preferred embodiment, the method of the invention may further comprise one or several additional operations selected from the group consisting of—but not limited to—thermal treatments (stress relief annealing, solution annealing, quenching), hot isostatic pressing, cleaning, chemical or mechanical surface finishing, electro-plating, electro-less plating and machining.

According to a more specific embodiment, the additional operations may comprise a machining step including at least one removal or reshaping operation applied on at least one portion of the conductive skeleton.

In this case and when sacrificial bridges are provided, the machining step might include at least removal of a sacrificial bridge.

Alternately or as a complement, the additional operations may comprise a machining step including removal of at least part of the structural hull and/or reshaping of the structural hull to provide mechanical interfaces or functions (pin holes, threads, recess, reference surface, flexures, engraving, etc.).

Alternately or as a complement, additional operations may comprise a machining step including reshaping of at least one of the first and second ends of said conductive wire to provide a predefined electromechanical interface geometry.

The invention also relates to a 3D electromechanical component obtainable by the implementation of a method according to the above features.

According to a first preferred embodiment, the 3D electromechanical component is a rotor for a SlipRing Assembly (SRA) manufactured by the implementation of a method comprising the steps consisting in: —implementing an additive manufacturing operation for building an electrically conductive skeleton of the rotor including a partly sacrificial structural hull, of substantially hollow cylindrical shape with a first closed end and a second open end, and a plurality of conductive wires located inside the structural hull, each of the conductive wires having a first end linked to the structural hull by means of a ring-shaped connector designed along the cylindrical envelope of the structural hull, and a second end linked to the structural hull by means of at least one sacrificial bridge;
   filling the structural hull with an electrically insulating material provided in a state in which it exhibits a liquid-like behaviour;
   implementing a solidification step to provide a solid-like behaviour of the insulating material;
   implementing an additional operation including removal of the sacrificial parts of the structural hull, for exposing the ring-shaped connectors, and of at least part of the sacrificial bridges.

Advantageously, the rotor manufacturing method may include a further additional operation, following the removal of the sacrificial parts of the structural hull and of at least part of the sacrificial bridge, consisting in electro-plating at least portions of the conductive skeleton which are intended to be used as electromechanical interfaces in the SlipRing Assembly.

Advantageously, this manufacturing method may include a further additional operation including removal of any remaining sacrificial bridge.

According to a second preferred embodiment, the 3D electromechanical component is a stator for a SlipRing Assembly manufactured by the implementation of a method comprising the steps consisting in:
   implementing an additive manufacturing operation for building an electrically conductive skeleton of the stator including a partly sacrificial structural hull, of substantially hollow shape, and a plurality of conductive wires located inside the structural hull, each of the conductive wires having a first end and a second end both linked to the structural hull by means of at least one sacrificial bridge;
   filling the structural hull with an electrically insulating material provided in a state in which it exhibits a liquid-like behaviour;
implementing a solidification step to provide a solid-like behaviour of the insulating material;
   implementing an additional operation including removal of the sacrificial parts of the structural hull, for exposing the second ends of the conductive wires, and of at least part of the sacrificial bridges.

The 3D electromechanical component manufactured by implementation of the method according to the present invention might be used in many other applications, for instance as a motor commutator, as a coil and/or a heating element.

BRIEF DESCRIPTION OF THE DRAWINGS

Further details of the invention will appear more clearly upon reading the description below, in connection with the following figures which illustrate:

FIG. 1a: a schematic cross-section view of an electromechanical component as obtained by implementing the method of the invention;

FIG. 1b: a partial perspective view of the component of FIG. 1a;

FIG. 2a: a schematic cross-section view, along a first plane, of a 3D electromechanical component, intended for a first exemplary application, as obtained by implementing the method of the invention;

FIG. 2b: a schematic cross-section view, along a second plane, of the 3D electromechanical component of FIG. 2a, the second plane being referred to as line T-T in FIG. 2a;

EMBODIMENTS OF THE INVENTION

Figure 2B:
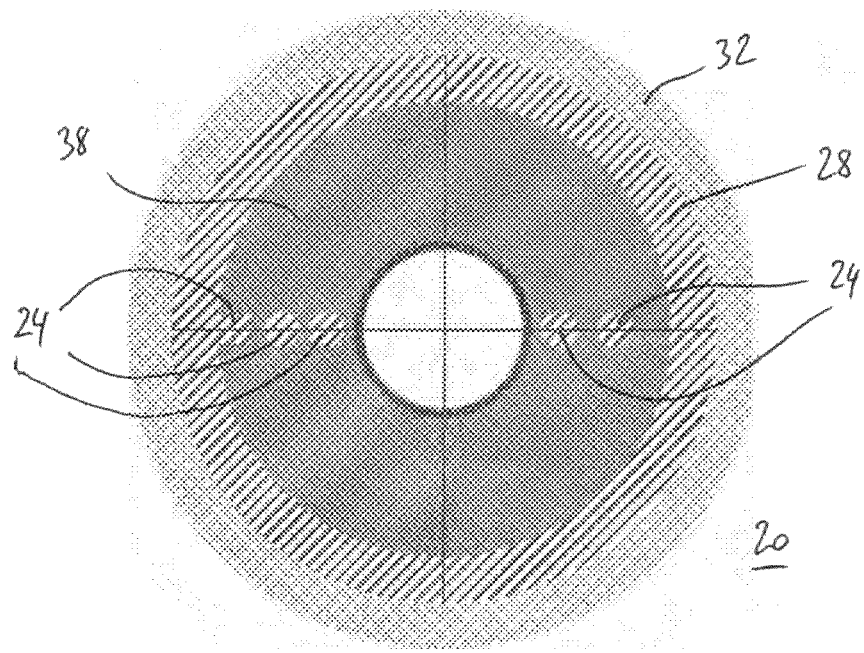

FIGS. 1a and 1b illustrates schematically the principle of the invention, on the one hand in a cross-section view and on the other hand in a partial perspective view, the invention revolving around a particular method of building a 3D electromechanical component 1. More precisely, FIG. 1b represents the top part of component 1 as illustrated in the view of FIG. 1a.

As already stated above, the concept proposed here consists of taking advantage of the additive manufacturing (AM) technologies to produce mechanical parts featuring built-in conductive wires or channels. The parts produced can take various 3D shapes and therefore accommodate to the specifications of the surrounding environment. Thanks to this concept, the use of connecting cables can be avoided, providing monolithic and robust solutions, with important simplification of the assembly process in electro-mechanical systems. Moreover, this ability to route electrical energy internally enables new possibilities for built-in sensors, active elements (thermal, inductive, photonics, etc. . . . ) and electrical interfaces.

Generally, the method of the invention comprises the following steps:
  one step of additive manufacturing, this step being preferably but in a non-limiting manner powder-based;
  one step of pouring or injecting an insulating material in a state in which it exhibits liquid-like behaviour, and
  one step of solidification of the insulating material to provide solid-like behaviour.

Most of the time, at least one additional step of subtractive machining might be necessary including an operation consisting in decoupling the built-in conductor from the structural part of the component.

Further additional steps might be required depending on the final component to be manufactured. Advantageously, one or several additional operations might be carried out, which can be selected from the group consisting of: thermal treatments (stress relief annealing, solution annealing, quenching), hot isostatic pressing, cleaning, chemical or mechanical surface finishing, electro-plating, electro-less plating and machining.

The 3D electromechanical component 1 illustrated on FIGS. 1a and 1b has an arbitrary random shape and comprises only one embedded conductive wire 2 for the purpose of disclosing the main aspects of the manufacturing method according to the invention.

A conventional AM printing machine might be used for implementing the first step, as previously mentioned. The design of the electrically conductive skeleton is printed on the basis of an appropriate conversion and implementation of the 3D design file with the software tools available to operate the AM printing machine design model.

At the end of this AM process, the 3D electrically conductive skeleton comprises the following features:
  a structural hull 4 which defines the physical or structural boundaries of the component, its main roles being to contain later a filling material, to give the component its structural main characteristics and, eventually, to include one or several mechanical interfaces;
  at least one electrical/conductive wire 2, whose main role is to achieve electrical power or information routing, and
  advantageously at least one sacrificial bridge 6, whose main role is to mechanically, and possibly electrically, link one or both ends of the conductive wire to the structural hull 4.

Indeed, mechanical stabilization is necessary until the conductive wires are embedded in the later solid-like insulating material. No more mechanical link is necessary then, once the filled in insulating material is made solid.

Moreover, an electrical link between the conductive wires and the structural hull might be useful in the case where a shunt has to be implemented. This is for instance the case when electroplating has to be performed, as will be explained later in the description.

Thus, the implementation of the invention starts with the design of the component to be manufactured and associated parts. During the design phase, the implementation of the built-in electrical routing and interface functions will depend on the statement of work related to the application.

The main aspects to be specified include:
  the number of conductive wires to be integrated,
  the specifications of the signals to be transmitted (voltage, current, power, frequency etc.), and of any additional function to be achieved (thermal heating, magnetic fields generation),
  the routing path inside the component to be manufactured,
  the location of the wire ends, and
  the electromechanical interfaces to be achieved.

Apart from the design features related to the conductive wires 2 and electrical interfaces, the structural hull 4 may include additional features: for example, when stringent mechanical loads are foreseen, the design of the hull may comprise lattice structures which increase the stiffness of the component. The detailed geometry of the hull might be determined by advanced design tools such as topology optimization.

Heat sink geometries and specific surface textures may also be integrated to respectively improve the thermal behaviour of the component or the adhesion between the hull and the later filled in material.

Mechanical interfaces are also part of the hull structure: those can be implemented to fulfil a mechanical interface function which will be used through all the service life of the component, or implemented to facilitate the manufacturing process and removed during a final machining step (e.g. injection gate interface, vacuum fitting for vacuum casting, air inlet or outlet).

This description is not exhaustive: the hull structure is to be seen as regular mechanical structure intended to be produced by an AM process. Therefore, on the one hand, the design specifications and characteristics of the design depend on the application. On the other hand, the design shall take into account the limitations related to the AM process (in the same way as for any conventional process). Once the design is finalized, the CAD file is converted into an input file for the AM machine, for example, an STL file.

The AM step, as such, can then be performed.

The AM step may, preferably but in a non-limiting way, rely on a metallic powder AM technology such as Selective Laser Melting (SLM), Electron Beam Melting (EBM) or Direct Metal Deposition (DMD). A wide range of metallic alloys are suited to implement the invention. Aluminium alloys are first choice materials because of their low density and high electrical and thermal conductivity. Copper is also a first choice material when high electrical and thermal conductivity is requested. Other alloys such as titanium alloys, and stainless steels can be used. Those will show lower thermal and electrical conductivity but higher mechanical performances.

Depending on the application requirements, it could be envisaged to use different types of metal powders for different parts of the structure, e.g. to selectively increase the mechanical performance of the structural part or the conductivity of the electrical conductors.

The specific alloy grades depend on the powder supplier. The invention was successfully implemented with aluminium and copper. The reference of the aluminium powder used is CL30AL (purchased from Concept Laser, see https://www.concept-laser.de/), while the copper powder was developed by the AM service provider itself. For both cases, Selective Laser Melting was used (Concept Laser M2 machine).

The overall volume range of the components might typically go from a cubic millimetre to a cubic meter, depending on the applications and the AM technologies and machines used to manufacture the components. The section of the conductive wires typically starts from 0.1 mm to several millimetres and can take various shapes (round, squared, rectangular, etc. . . . ).

The AM process might be followed by a number of usual post-process steps, among which might be:
thermal treatments for stress relief, solution annealing or quenching purpose,
Hot Isostatic Pressing (HIP) for internal defects reduction purpose,—cleaning, to remove any powder residue,
sand blasting, chemical or mechanical surface finishing to improve the surface quality of the components.

Once the 3D electrically conductive skeleton is completed, the insulating material 8 can be poured or injected inside the structural hull 4 because of its liquid-like behaviour.

Before it is filled with the insulating material 8, the 3D electrically conductive skeleton is prepared by temporarily sealing any aperture which could allow unwanted leaking of insulating material during the filling and solidification steps.

The hull 4 is then filled with the insulating material 8, the latter being in a state in which it exhibits liquid-like behaviour. The insulating material can be any from the following non-restrictive list including: a ceramic compound, including a glass material, a polymer, a cement, a thermosetting polymer (epoxy resin, polyester resin, polyurethane, silicone, etc. . . . ), and a thermoplastic polymer. In general, it is not mandatory that the filling material is insulating in liquid phase, but at least when made solid it must be insulating.

The filling technique can be adapted to the application and insulating material selected (casting, vacuum casting, injection). The insulating material can be reinforced with non-conductive fibres to improve its mechanical properties.

During the Applicant's experimentations, for instance, an epoxy resin (Huntsman specialty Epoxy, charged with reinforcing agent, see http://www.huntsman.com/advanced_materials) was successfully casted. An optically clear epoxy was also successfully tested (EPO-TEK 301-2).

An alternative to liquid casting and curing of polymers might be the filling of the hull volume with polymer or ceramic powder material. When polymers are used, a material melting step is then applied. For ceramics, a sintering step is to be performed. For certain ceramics, a Hot Isostatic Pressing step might be necessary to give the material its ultimate characteristics.

After the solidification of the insulating material, the component is ready for the next manufacturing step.

Any sacrificial bridges 6 might be removed thanks to a subtractive machining step such as drilling, milling, laser ablation or electro-discharge machining. The one skilled in the art will encounter no difficulty to implement any further known subtractive machining step, as a function of his own needs and without going beyond the scope of the invention.

Once the sacrificial bridges 6 are cut, the conductive wires 2 are no more electrically coupled to the hull 4. From this point, the built-in electrical routing function is achieved and the component 1 can be integrated at system level.

Depending on the requirements, a number of subsequent machining operations can be performed in order to finalise the shape of the electromechanical interfaces.

More particularly, the termination of the built-in conductors can take several forms which make it possible to merge the electrical interface function to the component and therefore simplify the physical architecture of the product, with subsequent assembly time and cost reduction.

The following interfaces are possible:
Pin contact: the wire termination as manufactured with AM takes the shape of a protrusion with respect to the physical boundaries of the component (i.e. the hull) the high aspect ratio of this protrusion is such that it assimilates to a pin geometry; this pin can be used for soldering, press fitting, wire wrapping or any other state of the art connection purpose;
Crimping contact: the protrusion described in the previous point takes the shape of a hollow pin which can be used for crimping purpose; the achievement of the hollow geometry relies either on direct execution during the AM process, or on a post-process subtractive machining step;
Pin hole soldering contact or press fitting contact: the termination of the wire includes a hollow volume in which a cable can be inserted and soldered or a pin element press-fitted; the achievement of the hollow geometry relies either on direct execution during the AM process, or on a post-process subtractive machining step;
Spring contact: the termination of the wire takes the shape of a flexure element such as a wire or blade geometry flexure; the achievement of the flexure geometry relies either on direct execution during the AM process, or on a post-process subtractive machining step, and
SlipRing or commutator contacts: the termination of the wire takes a circular shape such as a ring or cylinder (SlipRing) or an elongated shape such as a parallelepiped shape pad (commutator), achieved during the AM process; due to the poor surface quality of most powder-based AM process technologies, the final surface quality of the friction surface might advantageously be achieved through a post-process subtractive machining step.

Mechanical interfaces might also be achieved at this stage of the process. Illustrative examples of such interfaces will be disclosed later in the description.

Once the component has undergone re-machining steps, a number of subsequent steps may still be applied. Electroplating and electro-less plating might be of special interest, since they may be required to make the electric interfaces compatible for soldering.

For example, a component manufactured with aluminium and integrating soldering interfaces will require a nickel plating to show a full compatibility with the solder material. In the case of a SlipRing interface, the plating is intended to improve the friction properties of the SlipRing surface.

When plating is foreseen, it is worth mentioning that the sacrificial bridges might act as electrical continuity elements between the conductive wires and the hull, and/or between the wires themselves. Implementing sacrificial bridges can be of special interest to selectively apply the electroplating to specific areas: basically, only the areas connected to the electroplating electrode will be plated.

On a general basis, the ability to fully integrate electrical conductors to mechanical parts makes it possible to achieve the power supply of fully integrated sensors in a cable-less manner. Such a possibility triggers a significant gap with regard to the added-value of the final component. Note that the data collected by the sensors can be transmitted either by the same way or by means of wire-less communication modules such as Bluetooth or equivalent.

Further, given specific designs of the built-in wires, active elements can be fully integrated to the parts such as:

Built-in heating elements: to achieve this function, the built-in wires shall feature a well-defined combination of small conductive section and low conductivity material;

Magnetic fields generation elements: to achieve this function, the design of the built-in conductor shall take the form of a coil, whose shape is compatible with the design limitation pertaining to the AM process foreseen.

Now, two practical applications will be described in an illustrative and non-limiting fashion.

Figure 3:
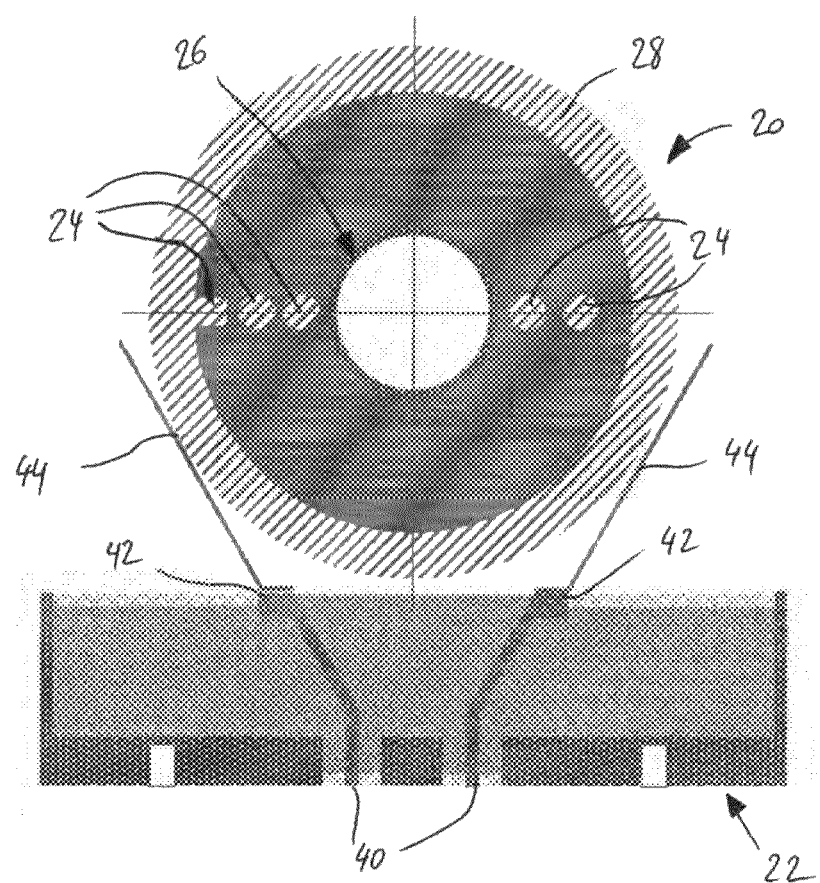
FIG. 3: a schematic cross-section view of an assembly including the 3D electromechanical component of FIGS. 2a and 2b.

FIGS. 2a and 2b illustrate, in two mutually orthogonal cross-sections, a component 20 which is intended to be used as a rotor in a SlipRing Assembly (SRA), illustrated in FIG. 3 as the rotor 20 is combined with an appropriate stator 22.

Both components 20 and 22 might advantageously be manufactured by implementation of the method of the invention. However, only the fabrication of the rotor 20 will be detailed here. The one skilled in the art will be able to adapt the present teaching to produce the stator 22 without any particular difficulty.

A SlipRing assembly (SRA) is an electrical continuity device which makes it possible to transfer electrical power and signals from a rotating body—connected to the rotor—to a fixed body—connected to the stator. A SlipRing assembly is therefore made of two sub-systems: the rotor and the stator. Such devices are widely used in satellites for various applications, the main one being Solar Array Drive Mechanisms (SADMs).

FIGS. 2a and 2b illustrate the architecture of the rotor part 20 of the SRA in a partially simplified way, i.e. the distribution of conductive wires 24 in the cylindrical design space was gathered within a 2D imaginary plane for more clarity.

The 3D skeleton design includes, not only the conductive wires 24 and the hull 26, but also five annular or ring shaped SlipRing interfaces 28 linked to first ends of the conductive wires 24 and five soldering interfaces 30 linked to the second ends of the conductive wires 24.

More precisely, the hull 26 is here of substantially hollow cylindrical shape, having an external cylindrical envelope 32 with a first closed end 34 and a second open end 36.

The electrically conductive skeleton might be manufactured by Selective Laser Melting, for instance on the basis of an aluminium alloy or pure copper.

The design advantageously includes two groups of sacrificial bridges 37 and 39 achieving dedicated functions: a first group of bridges 37 ensures the mechanical stability between the second ends of the conductive wires and the hull 26, while a second group of bridges 39 acts as shunts connecting the same ends of the conductive wires together.

After the AM fabrication and the usual post-process steps mentioned above, the hull 26 is filled with a specialty epoxy resin 38 purchased from Huntsman, including a glass based reinforcing load.

After the thermal curing of the resin 38, the component 20 is installed on a lathe and the external part of the hull is removed, i.e. the cylindrical envelope 32. The separated SlipRings 28 appear encapsulated in the resin 38, as the cylindrical envelope 32 is no more present.

The first group of sacrificial bridges 37 is also removed during this step so that only the electric features of the whole remain connected together (i.e. the conductive wires 24 together with their interfaces 28 and 30).

During the same re-machining step, the final shape of the rings is also executed (v-groove shapes).

Two soldering interface geometries might also be implemented, for instance, in a non-limiting fashion: pin hole interfaces, drilled during a re-machining step, or radially oriented nest-shape interfaces directly manufactured during the AM process.

After the re-machining, the structural stiffness of the rotor 20 is provided by the remaining metallic structure of the hull 26, located on the inner diameter and closed end 34 of the rotor 20. The resin 38 volume and the metallic rings 28 also contribute to the rotor 20 stiffness.

A selective electro-plating step is performed then, thanks to the temporary electrical continuity configuration provided by the second group of sacrificial bridges 39. During this step, only the electrical interfaces 28 and 30 emerging from the resin 38 are plated, while the resin 38 and the central metallic structure of the hull 26 remain uncoated. This selective plating allows reducing the mass of gold material deposited on the substrate.

The sacrificial bridges 39 are then removed in an additional machining step.

The five built-in wires might be manufactured with diameters down to 0.5 mm for instance.

The Applicant successfully built a rotor 20 with an external diameter after final machining of 33 mm with an overall height of 44 mm (and actually enclosing twelve conductive wires 24).

The rotor 20 finally produced can be combined to a stator 22, as illustrated on FIG. 3.

The preliminary design of the stator part 22 illustrated on FIG. 3 relies on the same concept than that applied for the rotor 20. In this example, pin hole press-fitting contacts are foreseen at wire terminations 40.

The wire termination 42 which gets in contact with the rotor part of the SRA features flexure brush contacts. Two strategies are foreseen: the first consists of fully integrated flexure brush elements 44 manufactured during the AM process. The second approach is to integrate mechanical interfaces to the wire terminations 42, with the aim to mechanically fix the flexure brushes 44. In this case, the flexure brushes would be produced separately.

Figure 4A:
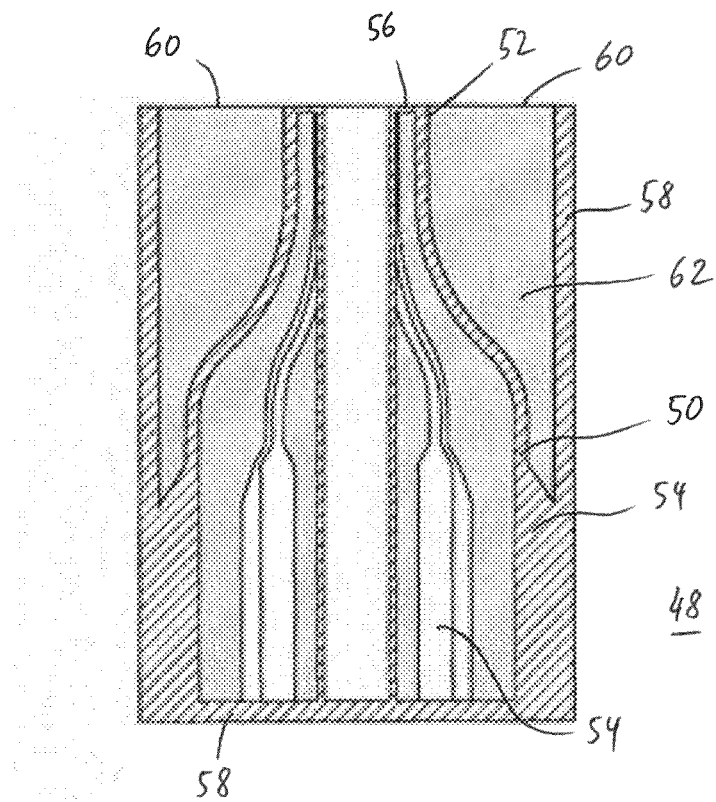
FIG. 4a: a schematic cross-section view of a 3D electromechanical component, intended for a second exemplary application, at an intermediate stage during implementation of the method of the invention.
Figure 4B:
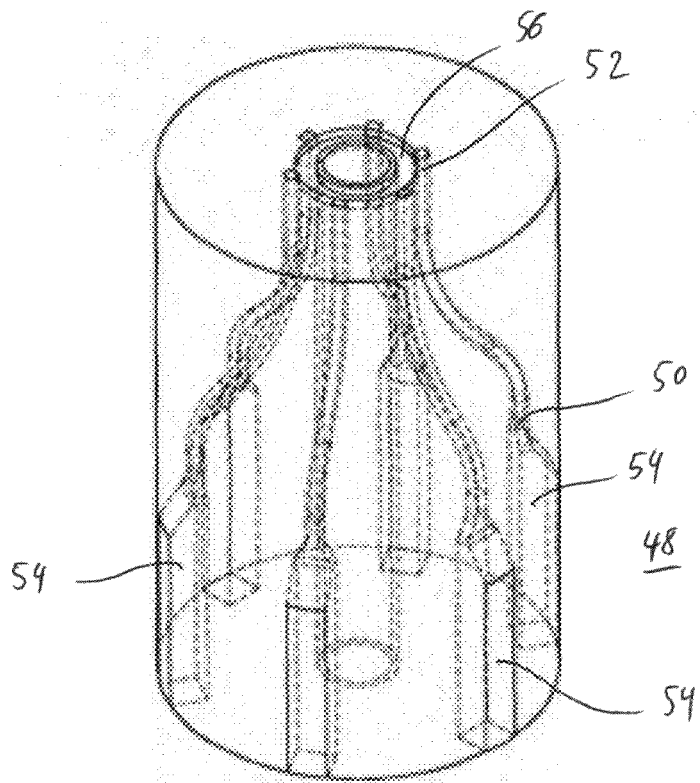
FIG. 4b: a perspective view of the 3D electromechanical component of FIG. 4a as finally obtained after implementation of the method of the invention.

FIGS. 4a and 4b illustrate another example of a possible application for a 3D electromechanical component manufactured according to the features of the present invention.

The invention can be applied to design and manufacture the commutator part 48 of motors (e.g. DC motors).

In the present example, the conductive wire ends 50 and 52 are respectively linked to commutator bars 54 and connections 56 to the rotor coils.

As shown on FIG. 4a, illustrating the component 48 at an intermediate stage of the process, the component 48 includes a sacrificial hull structure 58 which holds the commutator bars 54 and the sacrificial bridges 60. The sacrificial bridges 60 provide the mechanical stability to the conductive wires until a resin 62 is casted and cured.

In FIG. 4b, the terminations of the commutator bars 54 are illustrated with no specific interface, since any of the geometries previously described could be equally implemented, depending on the requirements.

This design can be scaled depending on the needs, from a few millimetres to more than 200 mm.

As a result of the implementation of the manufacturing method of the invention, 3D electromechanical components can be manufactured which exhibit such good mechanical (robustness as well as durability) and electrical (very good conductivity for transporting data as well as electrical power) characteristics that they can be used in many different applications and in many different environments. Furthermore, the sequential approach of the method of the invention makes it much more suitable for large scale manufacturing than the methods known from the prior art. Many components with complex 3D design which were only available in limited quantities up to now, because of high production costs, might become available in large quantities thanks to the method of the invention and the fact that it will provide massive production cost reductions.

As previously mentioned, it is noticeable that, generally, the electrically conductive skeleton might be made of any conductive material which can be processed by means of an AM technology, while suitable AM technologies comprise powder bed fusion, direct energy deposition, Fused Deposition Modeling (FDM) and material jetting. The conductive material might typically be provided as a liquid or as a powder and might include one or several materials taken from the group comprising pure metals, metal alloys, polymers and ceramic composites including a conductive charge (metallic or carbon).

Although the invention has been described in terms of particular embodiments, various modifications are possible without departing from the scope of the invention as defined in the appended claims. The above-mentioned features can be combined in any manner which makes technical sense.

What is claimed is:

1. A method for manufacturing a 3D electromechanical component comprising the steps of:
   providing an electrically conductive material which can be processed by means of an additive manufacturing technology;
   implementing an additive manufacturing operation, by processing said electrically conductive material through an additive manufacturing printing machine, for building an electrically conductive skeleton of the 3D electromechanical component including:
      a structural hull of a substantially hollow shape and adapted to contain a filling material having a liquid-like behaviour, and
      at least one conductive wire at least partially located inside said structural hull and having first and second ends, at least one of which is mechanically linked to said structural hull;
   filling said structural hull with an electrically insulating material provided in a state in which it exhibits a liquid-like behaviour in terms of flowability; and
   implementing a solidification step to solidify said insulating material, the latter thus embedding at least partially said conductive wire built through said additive manufacturing operation, so as to define an embedded electrical conductor.

2. The method according to claim 1, wherein each of said first and second ends of said conductive wire is linked to said structural hull.

3. The method according to claim 1, wherein at least one of said first and second ends of said conductive wire is linked to said structural hull by means of a sacrificial bridge.

4. The method according to claim 1, wherein it further comprises one or several additional operations selected from the group consisting of: thermal treatments, hot isostatic pressing, cleaning, chemical or mechanical surface finishing, electro-plating, electro-less plating and machining.

5. The method according to claim 4, wherein said additional operations comprise a machining step including at least one removal or reshaping operation applied on at least one portion of said electrically conductive skeleton.

6. The method according to claim 5, wherein at least one of said first and second ends of said conductive wire is linked to said structural hull by means of a sacrificial bridge, said machining step including at least removal of a sacrificial bridge.

7. The method according to claim 4, wherein said additional operations comprise a machining step including removal of at least part of said structural hull.

8. The method according to claim 4, wherein said additional operations comprise a machining step including reshaping of at least one of said first and second ends of said conductive wire to provide a predefined electromechanical interface geometry.

* * * * *